INVENTORS.
Emory W. Brockman.
BY Seymour C. Kantor.
Van Deventer + Shively
Attorneys.

June 17, 1958
E. W. BROCKMAN ET AL
2,839,250
ICE CHIPPER
Filed Oct. 13, 1954
3 Sheets-Sheet 2
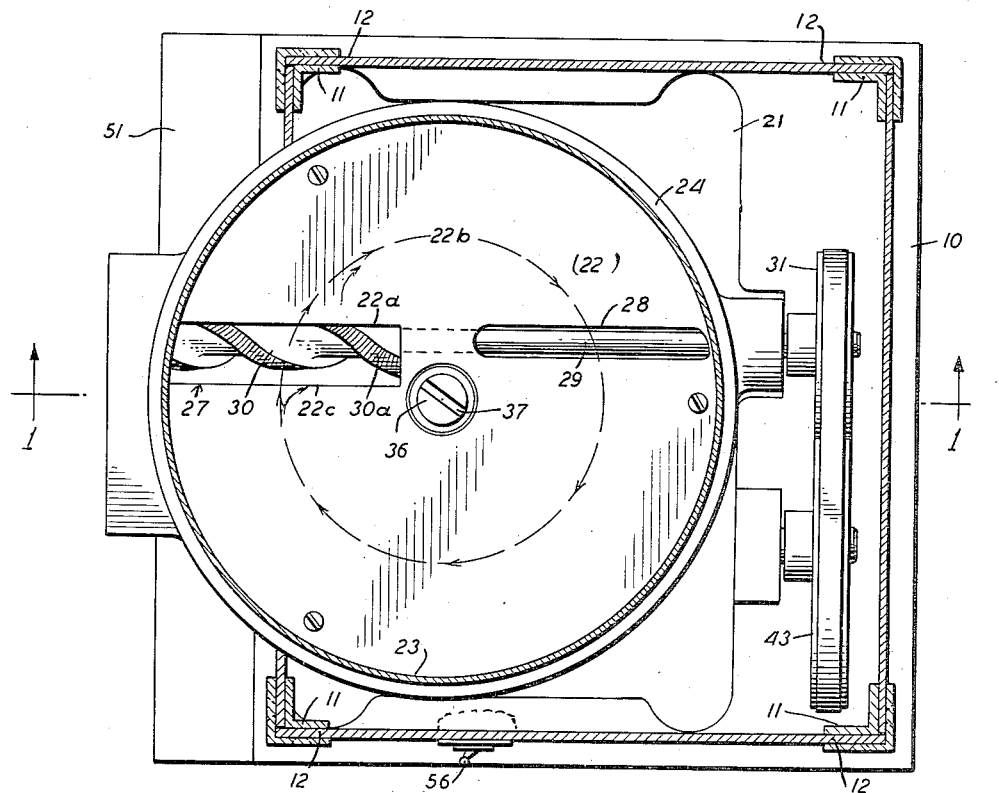
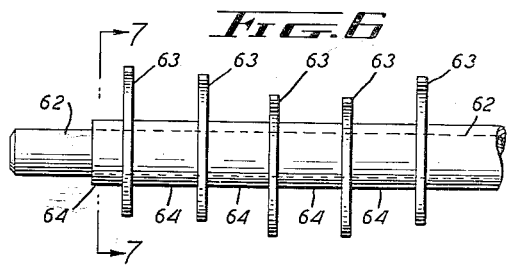
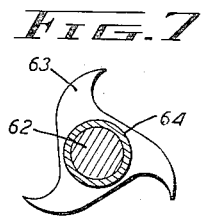
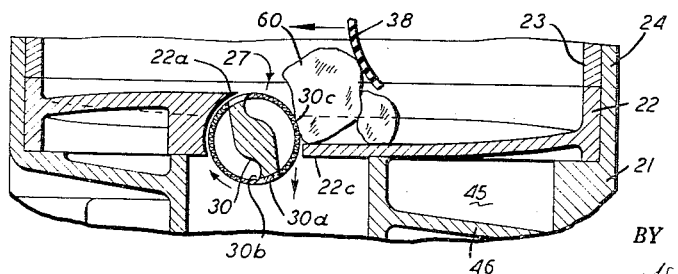
INVENTORS.
Emory W. Brockman.
BY Seymour C. Kantor.
Van Deventer & Shively
Attorneys.

June 17, 1958     E. W. BROCKMAN ET AL     2,839,250
ICE CHIPPER
Filed Oct. 13, 1954                                         3 Sheets-Sheet 3
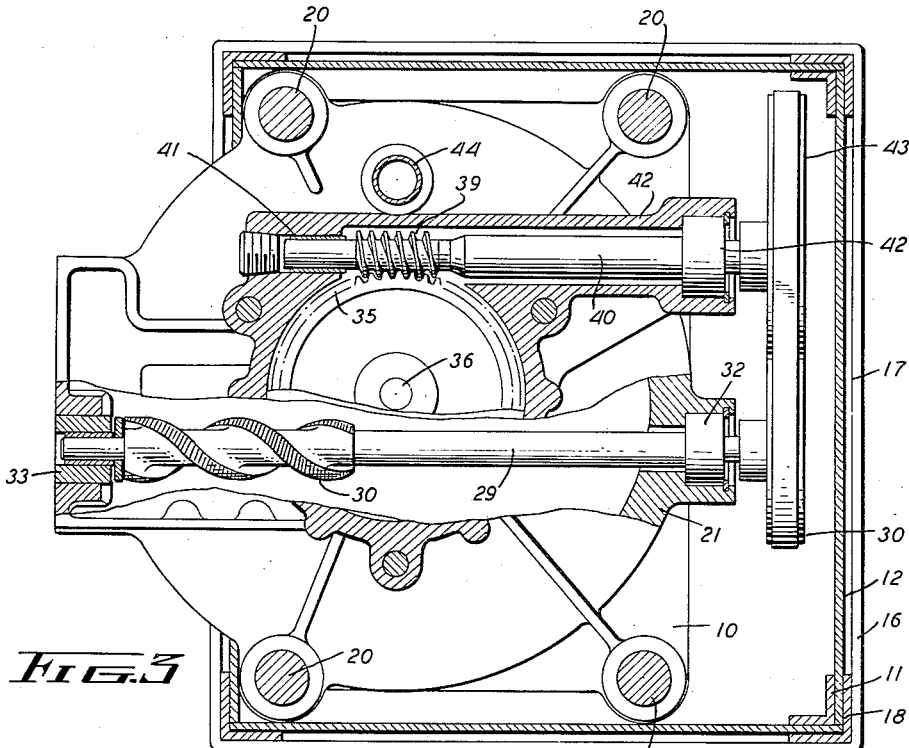
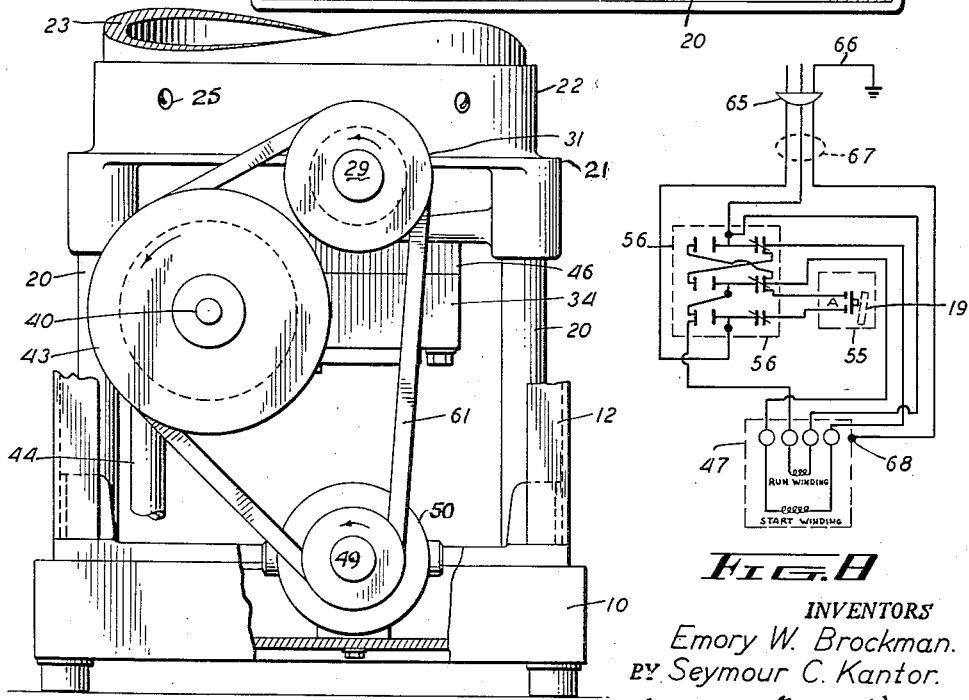
INVENTORS
Emory W. Brockman.
Seymour C. Kantor.
Van Deventer & Shively
Attorneys.

2,839,250
Patented June 17, 1958

2,839,250
ICE CHIPPER

Emory W. Brockman, Bala-Cynwyd, Pa., and Seymour C. Kantor, Forest Hills, N. Y.

Application October 13, 1954, Serial No. 462,079

4 Claims. (Cl. 241—36)

This invention relates to improvements in ice chipping devices and has for an object the provision of a device adapted to reduce pieces of ice to small chips or to what is termed "snow" ice particles depending upon the character of cutter used.

Another object is to provide a device having interchangeable cutter bars which not only cut the ice but also urge it to the outlet from the machine to deliver it to a receptacle outside the device.

A further object is to provide cutter bars for use in devices of the class described which are simple in construction, long-wearing and easily interchangeable.

Another object is to provide a device having a novel driving mechanism including a reversible motor for a purpose hereinafter described.

Other objects and advantages of the invention will become apparent from the following description in connection with the accompanying drawings, in which:

Fig. 1 is a vertical sectional view of a device embodying the invention.

Fig. 2 is a sectional view of a device embodying the invention (without the cover 59 and with the paddle 38 removed) on the line 2, 2 of Fig. 2.

Fig. 3 is a cut away bottom view of the bowl and cutter structure approximately on the line 3, 3 of Fig. 2.

Fig. 4 is a sectional rear view of the feed and cutter drives of the device shown in Figs. 1 and 2.

Fig. 5 is a fragmentary detail view of the bowl and cutter combination illustrating the combined action of the cutter and feed paddle.

Fig. 6 is a longitudinal view of an alternate form of cutter.

Fig. 7 is a cross sectional view on the line 7, 7 of Fig. 6.

Fig. 8 is a wiring diagram of the motor and switch connections used in the device shown in the preceding figures.

Figure 1:
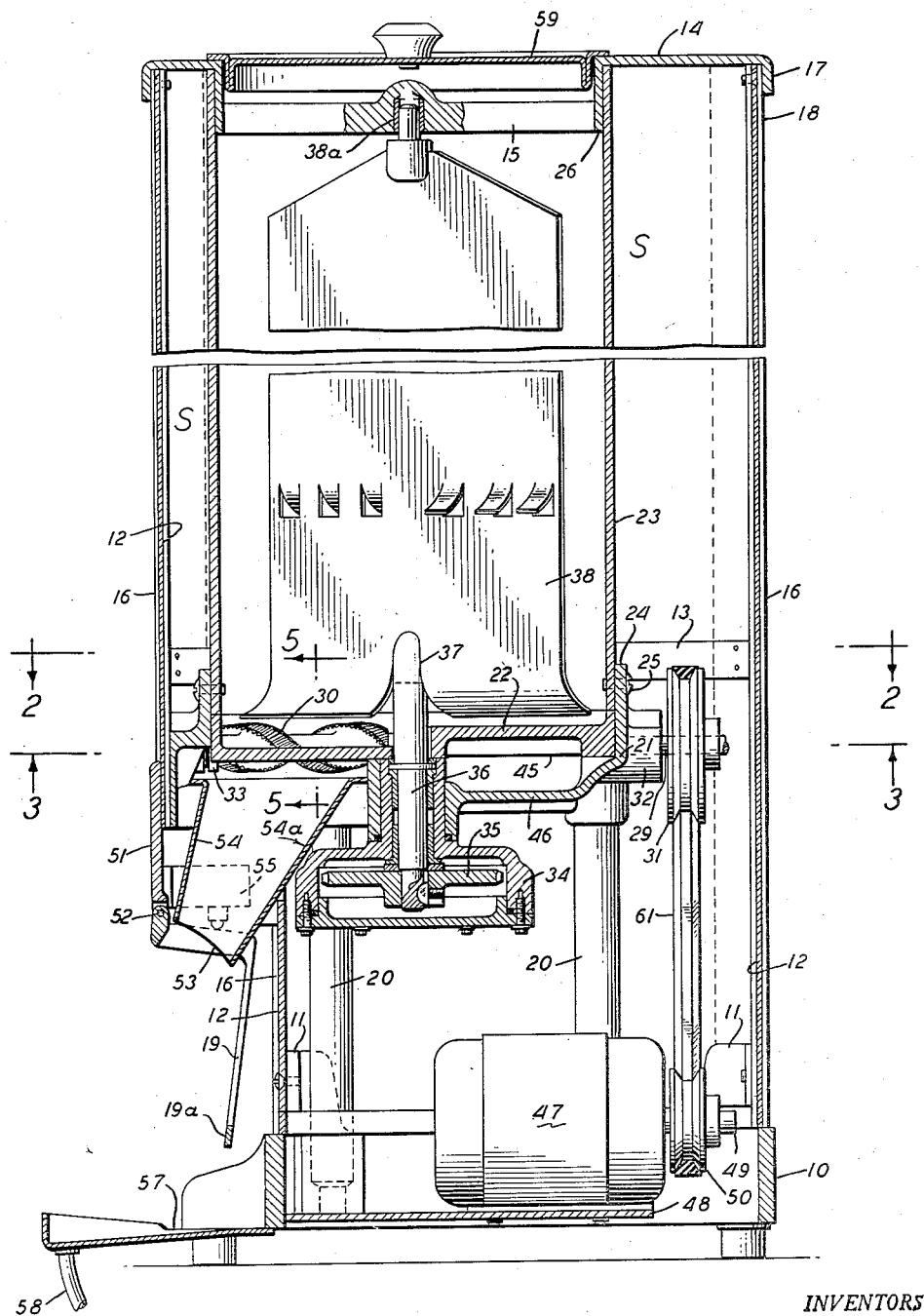

Referring to Fig. 1, the numeral 10 denotes a base having the upstanding ears 11 at each corner thereof adapted to be engaged by the downwardly extending legs 12 forming with the base a framework. These legs being joined by the side members 13 and the top member 14 which has a cross-rib 15 extending across the opening at the top thereof.

The frame has secured thereto in any suitable manner, the side plates 16, the top edges of which lie below the downwardly extending flange 17 of top 14, the vertical edges being concealed below the corner strips 18. The upper ends of strips 18 lie below flange 17 and the lower ends of these strips are secured to the lower edge of base 10 in any suitable manner. Thus all parts of the device are enclosed except the operating lever 19 and the handle 56 for the reversing switch, both of which elements are hereinafter described.

Mounted upon four posts 20 is a platform generally indicated by the numeral 21 forming a sub-frame, upon which is mounted a plate 22. Resting against plate 22 is a hopper 23 of any suitable construction, secured to the upstanding ring 24 of the sub frame by screws 25 or in any suitable manner. This hopper is also secured to the flange 26 of the top member 14.

The plate 22 is cut away as shown at 27 and 28 to expose the shaft 29 of the cutter bar 30, and said shaft has the pulley 31 on the outer end thereof. It is supported in bearings 32, 33 and it will be noted that the plate 22 is not flat, but starts at the high point 22a and slopes (as indicated by the line 22b in Fig. 2) to the point 22c. This leaves the cutter bar 30 exposed on its side 30c and partly on the top, so that ice can be impelled to the bar by the paddle impeller 38, the lower edge of which just clears the high point 22a of the top plate.

Secured to the sub-frame 21 in any suitable manner, is the gear box 34 carrying gear 35 having shaft 36 extending vertically and journalled in the gear box. The upper end of this shaft is split as shown at 37 to receive the lower edge of paddle blade 38 having an upper bearing 38a in the cross member 15. The paddle forms an agitating means for agitating ice in the hopper and feeding it into engagement with cutter 30. The ice will fall to the cutter bar by gravity, but the paddle insures uniform feeding and also prevents the ice in the hopper from sticking together in a solid mass which sometimes occurs.

The gear 35 meshes with worm 39 on shaft 40 having bearings 41 and 42 supported in the sub-frame 21. The outer end of shaft 40 has secured thereto the pulley 43.

A drain pipe 44 connects at its upper end with the chamber or space 45 below the plate 22, the lower wall 46 of said chamber being formed by the wall of the sub-frame 21.

A motor 47 is mounted in any suitable manner on the plate 48 forming a closure for the base 10. Said motor has a shaft 49 on which is mounted the pulley 50.

A cross member 51 extends across the front of the device, and pivoted thereto at 52 is an operating lever 19 which is cut away to expose the lower end 53 of the spout 54 having its upper end secured to the sub-frame 21 immediately below the discharge end of the cutter bar 30. The spout is exposed to the length of the cutter bar immediately above same.

An operating switch 55 mounted on the cross-member 51 has a plunger operated by lever 19 when the latter is pressed inwardly.

A reversing switch 56 is mounted on one of the side plates or at any other convenient point, and switches 55 and 56 and the motor 47 are connected as shown in Fig. 8. The driving pulley 50 of motor 47 is connected via belt 61 to drive pulleys 31 and 43 which drive the cutter bar 30 and paddle 38 at proper relative speeds.

The base 10 may have a forward extension 57 forming a drip-pan under spout 54, and a drain pipe 58 may be connected to the pan to carry off the water.

A lid 59 is provided for closing the top of the device and if desired, any suitable insulation can surround the hopper, said insulation lying within the space S.

Reverting to the cutter bar 30 it will be noted that it is fluted much like an ordinary reamer, but that the outer edges of the flutes are serrated or toothed, or shown at 30a (Fig. 2). The result is that as the bar revolves, the teeth 30a cut the ice 60 with which they come in contact, the chunks of ice being swept into the bar 30 by the revolving paddle 38.

The ice so cut is discharged downwards into the spout 54. With teeth 30a spaced about 8 per inch of flute, and the teeth being hooked inwardly as shown at 30b, what is commonly termed "snow ice" will be produced, where the particles are soft and resemble snow flakes. Such snow ice is commonly used to make "snow balls" and for similar purposes.

It will be noted that the construction of the cutter bar 30 is such that it performs the double function of chipping ice and propelling the chipped particles to the spout 54. This action is particularly desirable with "snow ice," the particles of which are so fine that they sometimes stick together and clog the machine. With the construction herein disclosed, the particles fall freely from the flutes of the cutter bar and on to the downwardly sloping side 54a of the spout and slide off 54a directly into a glass or other receptacle below the discharge end 53 of the spout. The cutter bars 30 are easily removable by removing pulley 31 (usually held on shaft 29 by a set screw not shown) and removing bearing 33 (also usually held by a set screw not shown) and then pulling the cutter bar out to the left as shown in Fig. 3.

By this means the bar 30 is readily removed for sharpening. Also other cutter bars such as that shown in Figs. 6 and 7 may be used to obtain what is commonly termed "chipped" or "shaved" ice where the chips are larger than the "snow ice."

In Fig. 6 the shaft 62 carries a plurality of chipping elements 63 spaced apart by collars 64. These elements will produce chipped ice with particles large enough to tinkle when used in a drink, and often used to surround oysters served on the half-shell and for surrounding servings of grapefruit and the like.

The water drainpipe 44 will drain off any water that collects in the chamber 45 below the opening 28 in plate 21 thereby preventing this water from finding its way from the bottom of the hopper via opening 27 to spout 54.

Drain pipes 44 and 58 extend outwardly from the machine.

Fig. 8 is a wiring diagram of the electrical connections to the motor 47.

The connecting plug 65 has 3 prongs, prong 66 connecting to ground. The cord 67 passes through a suitable opening (not shown) in the side of base 10. The conductor extending to prong 66 is connected to the motor frame 68 thereby grounding all metal parts of the device.

The operating switch 55 and reversing switch 56 are connected as shown; in Fig. 8 switches 55 and 56 are in normal position. Closing switch 55 operates the device as presently described. Closing switch 56 reverses the direction of the motor.

*Operation*

The hopper 23 is filled with pieces of ice. Often ordinary ice cubes are used.

The user pushes a glass against the cross-bar 19a of operating lever 19 thereby moving it inwardly, which also positions the glass underneath the discharge end 53 of spout 54.

This closes switch 55, energizing motor 47 which via pulley 50 and belt 61 revolves the pulleys 31 and 43. This operates paddle 38 which slowly revolves, freeing the lumps of ice from each other and urging these lumps as indicated at 60 Fig. 5 to the cutter bar 30.

The bar 30 chips the ice as long as operating lever 19 is held in, and the ice is discharged at 53 directly into the glass without being handled.

When sufficient ice is in the glass, lever 19 is released by withdrawing the glass from the device and the operation ceases.

Should the cutter bar 30 become clogged, by closing switch 56 the direction of rotation of bar 30 is reversed and the clogged snow-ice is thrown off the flutes of the bar and the machine freed for operation. A mere touch of switch 56 is usually sufficient to accomplish this.

What is claimed is:

1. In a device of the character described, a framework; a motor mounted on said framework and having a shaft; a sub-frame carried by said framework; a first driven shaft mounted on said sub-frame; a vertical shaft mounted on said sub-frame; gearing between said driven and vertical shafts; a paddle fixedly mounted at its lower end on said vertical shaft to be rotated thereby; a hopper surrounding said paddle and supported on said framework; said paddle being vertically disposed centrally of the hopper and extending laterally well out toward the side wall of the hopper, a second driven shaft mounted in said sub-frame; a cutter bar driven by said second shaft, said bar having cutting portions in communication with the interior of said hopper, said bar being revolvably mounted in said sub-frame; a spout adapted to receive ice discharged from said cutter bar and supported subjacent said bar; and driving means extending between said motor shaft and said first and second driven shafts whereby said driven shafts may be rotated by said motor.

2. The combination as claimed in claim 1 wherein said framework includes a top member having a cross-member therein, said paddle having an upwardly extending shaft supported in said cross-member.

3. The combination as claimed in claim 1 including a cross-member secured to the front of said device; an operating lever pivotally secured at its upper end to said cross member for swinging movement vertically, said lever being positioned adjacent said spout and extending below the same; a switch operatively connected to said lever; and a circuit including said switch and said motor whereby upon actuation of said lever, said switch will close said circuit to apply power to said motor to operate the same.

4. In an ice chipping device, a base, a frame extending upwardly from the base, said frame including a platform at the top thereof, a plate mounted on top of said platform, a vertically extending hopper fitting at its lower end upon said plate, the plate having an elongated aperture therein extending inwardly from an outer peripheral part of the same, a rotary cutter supported in said frame to extend along said aperture with a portion lying within the aperture, the cutter bar having spaced teeth along the same adapted to chip ice delivered thereto from the hopper and to impel the chipped ice downwardly from said aperture, a spout disposed below said aperture to receive the chipped ice discharged from said aperture, said plate and said platform having opposing vertically spaced portions forming a chamber therebetween that is separated from said elongated aperture in said top plate, the plate having a second aperture therein spaced from the first mentioned aperture and overlying a part of said chamber, conduit means connected to said chamber to drain water from the same, received therein from the hopper, and means for rotating the cutter bar.

References Cited in the file of this patent

UNITED STATES PATENTS

| | | |
|---|---|---|
| Re. 20,952 | Smith | Dec. 20, 1938 |
| 509,564 | Zehe | Nov. 28, 1893 |
| 1,845,636 | Walker | Feb. 16, 1932 |
| 1,883,876 | Brown | Oct. 25, 1932 |
| 1,987,946 | Shaw et al. | Jan. 15, 1935 |
| 2,225,171 | Hammes | Dec. 17, 1940 |
| 2,519,985 | Thompson | Aug. 22, 1950 |
| 2,539,734 | Echols et al. | Jan. 30, 1951 |
| 2,650,745 | Oberwortman | Sept. 1, 1953 |